(12) United States Patent
Law (10) Patent No.: US 8,209,933 B2
(45) Date of Patent: Jul. 3, 2012

(54) CONNECTOR

(75) Inventor: Graham Law, Chesterfield (GB)

(73) Assignee: Ancon Limited, Sheffield (GB)

( * ) Notice: Subject to any disclaimer, the term of this patent is extended or adjusted under 35 U.S.C. 154(b) by 40 days.

(21) Appl. No.: 12/676,194

(22) PCT Filed: Aug. 21, 2008

(86) PCT No.: PCT/GB2008/050727
§ 371 (c)(1),
(2), (4) Date: Apr. 29, 2010

(87) PCT Pub. No.: WO2009/030940
PCT Pub. Date: Mar. 12, 2009

(65) Prior Publication Data
US 2010/0199589 A1 Aug. 12, 2010

(30) Foreign Application Priority Data
Sep. 5, 2007 (GB) .................................. 0717254.7

(51) Int. Cl.
*E04B 2/00* (2006.01)
(52) U.S. Cl. ...................... 52/585.1; 52/125.5; 404/47

(58) Field of Classification Search ................. 52/585.1, 52/125.5, 127.4, 127.7, 583.1; 404/47, 49, 404/51, 52, 57, 62, 63
See application file for complete search history.

(56) References Cited

U.S. PATENT DOCUMENTS

| 5,634,312 A * | 6/1997 | Tolliver et al. | 52/585.1 |
| 7,134,805 B2 * | 11/2006 | Yee | 404/50 |
| 2005/0220539 A1 | 10/2005 | Yee | |

FOREIGN PATENT DOCUMENTS

| DE | 4215435 A1 | 11/1993 |
| DE | 4215435 A1 * | 11/1993 |
| DE | 9401386 U1 | 3/1994 |

OTHER PUBLICATIONS

Hellberg, Jan, "International Search Report", for PCT/GB2008/050727 as mailed Oct. 29, 2009, 3 pages.

* cited by examiner

*Primary Examiner* — Brian Glessner
*Assistant Examiner* — Paola Agudelo
(74) *Attorney, Agent, or Firm* — Winstead PC (57) ABSTRACT

A connector comprising a guide tube, and a dowel, the guide tube being arranged to receive an end of the dowel, characterized by the end of the dowel passing through the guide tube into a fixing chamber via an orifice, 5 the fixing chamber being arranged to receive a fixing means, the fixing means being arranged to restrict the motion of the dowel within the guide tube.

33 Claims, 9 Drawing Sheets

CONNECTOR

This invention relates to a connector. More particularly, but not exclusively, it relates to a shear connector for transferring shear between adjacent blocks of building materials.

A standard shear connector, or dowel, is designed to transfer vertical shear and sometimes horizontal shear across a joint between blocks of building materials, for example concrete floor slabs or concrete beams. Typically, dowels are circular cross-sectioned rods, although other cross-sectional shapes can be used. Such shear connectors simplify the construction of structures by removing the requirement for keyed joints, double columns and corbel supports.

Some shear connectors also allow longitudinal movement in the direction of a main dowel. This is achieved by locating the dowel within a sleeve which has an internal diameter that is slightly larger than that of the dowel A particular type of shear connector allows lateral as well as longitudinal movement to occur. This is achieved by introducing a rectangular box section sleeve which has an internal height slightly larger than the external diameter of the tubular sleeve. The tubular sleeve is centred within the rectangular box section to ensure that movement can take place in either direction. Vertical shear loads transfer across the joint in the standard manner associated with a simple dowel shear connector.

However, under certain circumstances the dowel requires to be locked in order to prevent further movement once initial movement occurred. This can apply, for example, under seismic or large ground movements. More typically, such locking dowels are required in post-tensioned structures to replace pour strips. Pour strips are unpopular with construction workers as the additional propping and formwork that is associated with them disrupts site access.

Such joints can be at, or below, ground level where continuity in the slab is necessary in order to resist large earth pressure loads applied to the structure once the temporary ground anchors in the shoring are destressed. Alternatively, such a joint may be used in a suspended floor arrangement, i.e. above ground level.

No existing shear or other connector provides for the locking of the dowel following the cessation of an initial phase of movement.

According to a first aspect of the present invention there is provided a connector comprising a guide tube, and a dowel, the guide tube being arranged to receive an end of the dowel, characterised by the said end of the dowel passing through the guide tube into a fixing chamber via an orifice, the fixing chamber being arranged to receive a fixing means, the fixing means being arranged to restrict the motion of the dowel within the guide tube.

Such a connector allows initial motion of the dowel within the guide tube whilst restricting, and ideally preventing, motion of the dowel once the fixing means is received in the fixing chamber and where applicable conditioned or positioned into a fixing configuration.

A connector according to the invention is modified such that the dowel has at least one end provided with a guide tube and fixing chamber assembly as above described so as to allow the initial motion of the dowel within the guide tube whilst restricting motion of the dowel once the fixing means is in place. Another end is conveniently retained in a fixed relationship with and for example in a building material during use, for example buried within or in fixed relation with a surface thereof.

Thus, the dowel conveniently has a first end adapted to be so retained in a fixed relationship with a building material and a second end provided with a guide tube and fixing chamber assembly as hereinabove defined.

In a simple embodiment, the first end is adapted to be so retained in that it is provided with a fixing formation adapted to be retained directly in fixed relation with a building material. For example the first end is structured to be retained within a building material. For example, a formation is provided to key within a setting concrete or like structure. Alternatively the first end comprises mechanical fixing means to fix in or upon the surface of a building material. Thus, the first end is inherently fixed in situ initially and initial motion of the dowel at the second end only is enabled.

In an alternative embodiment the first end is also provided with a fixing formation adapted to allow initial motion of the dowel longitudinally or laterally. Preferably such a fixing formation comprises an assembly employing equivalent principles to that at the second end. Thus, the first end is adapted to be retained within a building material by means of a further guide tube and fixing chamber assembly including a further fixing chamber arranged to receive a fixing means, the fixing means being arranged to restrict the motion of the dowel within the guide tube. Thus, a guide tube and fixing chamber assembly providing for selective fixing of the dowel according to the principles of the invention is provided at both the first and the second end. Alternatively, a fixing formation of alternate and for example conventional design adapted to allow initial motion of the dowel longitudinally or laterally is provided at the first end.

The connector is for example a connector for transferring load between adjacent blocks of building materials and in particular a shear connector for transferring shear between adjacent blocks of building materials.

The fixing chamber may be formed integrally with the guide tube.

The provision of the fixing chamber integrally with the guide tube simplifies installation of the connector into a structure under construction.

The fixing chamber may extend perpendicularly to the longitudinal axis of the guide tube.

In one possible embodiment, the fixing means comprises a fixing member selectively mechanically engageable with the dowel in the fixing chamber. The fixing member may be configured such that fixing is effected simply by its insertion into the fixing chamber or may require some secondary fixing or locking action. Conveniently for example the fixing means comprises a an insert structured to engage with a suitably shaped formation on the dowel in the fixing chamber, for example in that a portion of the insert and a portion of the dowel are complementarily shaped and for example complementarily threaded.

The fixing member comprises a locking device. A locking device may be selectively positionable between a first unlocked position whereat the dowel is free to move and a second locked position whereat the locking device engages the dowel in such manner as to restrict, and ideally prevent, motion of the dowel. Alternatively a locking device may be configured such as to inherently lock the dowel once it is placed in position.

Additionally or alternatively, the fixing means comprises a fixing medium which is introduced into the fixing chamber. Preferably the fixing medium comprises a fluid which is introduceable to the fixing chamber in fluid form and hardenable to a less fluid and for example a set form where it fixes the dowel in such manner as to restrict, and ideally prevent, motion of the dowel. For example the fixing medium is a curable or settable material capable of being introduced into the fixing chamber in fluid state and curable or settable in situ.

Preferable the fixing medium is introduced so as to substantially fill residual space in the fixing chamber once the dowel is in situ therein.

The connector may comprise a sleeve which receives the guide tube, the sleeve having a lateral width in excess of that of the guide tube. Alternatively, the guide tube may itself comprise a sleeve having a lateral width in excess of that of the dowel.

The dowel may pass through the guide tube and into a section of the sleeve. The fixing chamber may be formed integrally with the sleeve. The dowel may pass through the section of the sleeve and into the fixing chamber.

The use of such a sleeve allows for lateral and rotational movement prior to the introduction of the fixing medium.

The connector may comprise an intermediate sleeve located between the guide tube and the sleeve. The intermediate sleeve may be fabricated of a compressible material, for example a plastics foam material.

The intermediate sleeve serves to limit the egress of a fixing medium such as a grout, or resin, down the sleeve and into the region of the joint between adjoining blocks of construction material.

The fixing chamber may comprise a box having an open end, the open end being arranged to receive the fixing medium. The fixing chamber may comprise a cap arranged to releasably seal the fixing chamber. The orifice may be remote from the open end. The fixing chamber may comprise a tube arranged to engage an opening of the box.

The fixing chamber may be removable from the shear connector.

The use of a removable fixing chamber is particularly advantageous in conjunction with use of a fixing medium in that it may allow the fixing chamber to act as a former which is then removed in order that the fixing medium bonds directly with the material of the building structure in which it is retained rather than the material of the fixing chamber. Such a removable fixing chamber provides for better adhesion of the fixing medium to the structure under construction.

The fixing chamber may comprise a plastics material.

The dowel may comprise a keyed section comprising a keying formation arranged to pass into the fixing chamber. The keyed section may be arranged to engage with the fixing medium and/or with the fixing member. The keyed section may be located at the second end of the dowel. The keying formation may comprise any one, or combination of the following: groove, step, channel, saw-tooth, waisted section. The keying formation may extend laterally about the second end of the dowel. The second end of the dowel may comprise a screw thread arranged to receive a nut.

The keying formation may improve the engagement of the dowel with a fixing medium and thereby improves the locking of the dowel into position. Additionally or alternatively the keying formation may provide for direct mechanical engagement with a fixing member.

The connector may comprise a locking device. The locking device may engage the keying formation. The locking device may comprise a plate. The plate may be arcuate for example comprising a sector of a circle, rectangular, hexagonal or otherwise polygonal.

A locking device may be used in combination with a fixing medium. In such a combination, the locking device transfers any longitudinal tensile and lateral forces from the dowel into the fixing medium within the fixing chamber and aids in the restriction of movement.

The fixing medium may comprise a grout or a resin. The fixing medium may be pourable prior to setting.

The connector may comprise a single dowel or a plurality of dowels without departing from the principles of the invention. Where plural dowels are provide they may conveniently be in parallel array. Each dowel may be provided with a separate guide tube and fixing chamber at at least one end in accordance with the principles of the invention hereinabove, or a common guide tube and/or a common fixing chamber may be provided to receive the ends of more than one such dowels.

According to a second aspect of the present invention there is provided a method of locking a dowel of a connector comprising the steps of: providing a connector according to the first aspect of the present invention;

introducing a fixing means into the fixing chamber; and fixing the fixing means to restrict the motion of the dowel within the guide tube.

In one embodiment the fixing means comprises a fixing member selectively engageable with the dowel in the fixing chamber and the step of fixing the fixing means comprises engaging the fixing member with the dowel.

Additionally or alternatively the fixing means comprises a hardenable fixing medium and the step of fixing the fixing means comprises introducing fixing medium into the fixing chamber and for example substantially filling the fixing chamber with fixing medium;

allowing the fixing medium to harden.

The method of the second aspect of the present invention is thus primarily a method of use of a connector according to the first aspect of the invention, and other preferred features of the method will be appreciated by analogy.

According to a third aspect of the present invention there is provided kit of parts for providing a connector according to a first aspect of the present invention comprising:

a dowel;

a guide tube; and a fixing chamber.

The kit may comprise a sleeve. The kit may comprise a fixing medium. The kit may comprise a fixing means for example a locking device.

According to a fourth aspect of the present invention there is provided a kit for retrofitting a fixing chamber to a known connector comprising a fixing chamber.

The kit may comprise a dowel comprising a keyed section. The keyed section may be arranged to engage with a fixing medium and/or with a mechanical fixing means. The keyed section may be located at the second end of the dowel. The keying formation may comprise any one, or combination of the following: groove, step, channel, saw-tooth <INSERT>. The keying formation may extend laterally about a free end of the dowel.

The kit may comprise a mechanical fixing member selectively mechanically engageable with the dowel in the fixing chamber, such as a locking device. The locking device may be adapted to engage the keying formation. The locking device may comprise a plate. The plate may be arcuate for example comprising a sector of a circle, rectangular, hexagonal or otherwise polygonal.

The kit may comprise a fixing medium. Preferably the fixing medium comprises a fluid which is introduceable to the fixing chamber in fluid form and hardenable to a less fluid and for example a set form. For example the fixing medium is a curable or settable material capable of being introduced into the fixing chamber in fluid state and curable or settable in situ. The fixing medium may comprise a grout or a resin. The fixing medium may be pourable prior to setting.

The dowel may be selectively fixed in accordance with the principles of the invention by means of a mechanical fixing member alone or by means of a hardenable fixing medium alone or by means of a combination thereof.

Embodiments of the present invention will now be described, by way of example only, with reference to the accompanying drawings, in which.

Referring now to FIGS. 1 to 7d, a shear connector 100 comprises a dowel 102, a guide tube 104, a sleeve 106 and a fixing chamber 108. In the present embodiment a locking plate 110 is used although this is not essential.

Figure 15:
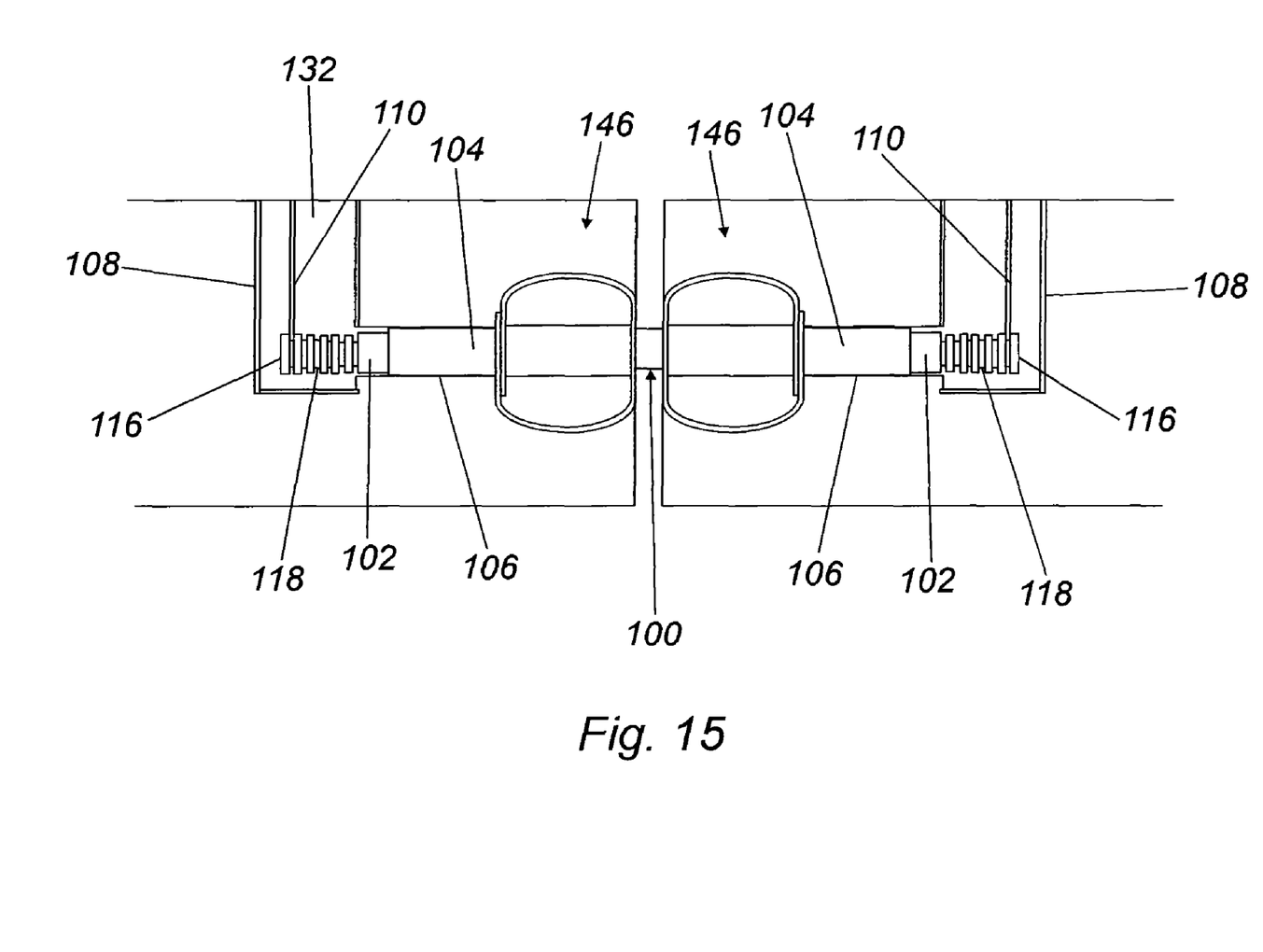
FIG. 15 is a sectional representation of an embodiment of a shear connector according to another aspect of the present invention, in use.

The dowel 102 comprises a cylindrical rod 112 having an upset head 114 at one end and a keyed formation 116 at the other end. The upset head constitutes a fixed mounting, so that an adjustable mounting in accordance with the invention is provided only at the other end in this embodiment. It will be appreciated that this is an example only. Alternative fixed structures are discussed below with reference to FIG. 13. Other forms of fixing can be envisaged to replace the upset head, including mechanical mounts to attach onto or into a structure and adjustable mounts. For example, as illustrated in FIG. 15, the apparatus could have guide tube, sleeve and fixing chamber assembly at either end where it was desirable to allow for both to be adjustable initially.

Typically, the dowel 102 is 30 mm diameter and 500 mm long. However, it will be appreciated that the dowel 102 may have a diameter between 12 mm and 60 mm and a length between 300 mm and 1000 mm.

In the present embodiment the keyed formation 116 takes the form of a series of annular grooves 118 passing about the end of the rod 112. Typically, the grooves 118 are 5 mm deep with a pitch of between 10 mm to 60 mm. However, it will be appreciated that the depth of the grooves 118 may vary dependent upon the diameter of the dowel 102.

It will be further appreciated that other keyed formations such as step, saw-tooth and channels are considered suitable formations on the dowel 102

The guide tube 104 is a hollow cylindrical tube having a diameter suitable to accommodate the dowel 102. Typically, the guide tube 104 has an inner diameter only slightly larger than that of the dowel 102 in order to prevent excess relative movement between the two.

The sleeve 106 comprises a facia plate 120, and a hollow, elongate cover section 122.

The facia plate 120 opens into the cover section 122 through a rectangular opening 126. The cover section opens into the fixing chamber 108 through a rectangular orifice 128.

The fixing chamber 108 comprises a hollow box 130 that has one open end 132. A cap 133 is provided to close the box 130. The orifice 128 is located adjacent the opposite end of the box 130 from the open end 132.

It will be appreciated that the fixing chamber 108 may be formed integrally with the sleeve 106, attached to the sleeve 106, for example by welding. Alternatively, the fixing chamber 108 may be separable from the sleeve 106, for example as plastics unit, once the chamber is formed within the block of building material.

Figure 5:
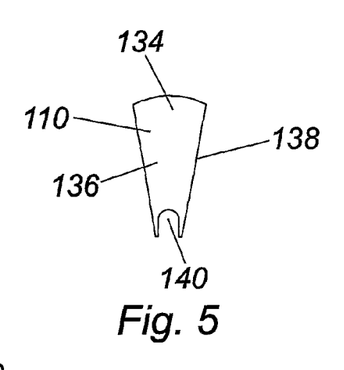
FIG. 5 is a front elevation of a locking plate of the shear connector of FIGS. 1 and 2.

The locking plate 110 comprises a convex arcuate outer edge 134, linear lateral edges 136,138 and a concave arcuate inner edge 140. The radius of curvature of the inner edge 140 of the locking plate 110 is substantially the same as that of the grooves 118 of the keyed formation 116 of the dowel 102.

In use, the upset head 114 is set in a first block of building material 142, typically concrete. A looped sleeve 144 is provided in the illustrated embodiment for added strength of fixing in the concrete, in particular in that it acts as a load spreader. A similar loop is provided in the other block. Other load spreaders may be envisaged, for example in the form of alternatively shaped sleeves, suitably shaped projections etc. A load spreader may be absent.

The sleeve 106 and fixing chamber 108 are set in a second block of building material 146 with the open end 132 of the box 130 remaining accessible. The cap 133 can be placed over the open end 132 in order to ensure this.

The guide tube 104 locates within the cover section 122 of the sleeve 106. The keyed formation 116 of the dowel 102 passes through the guide tube 104 and into the fixing chamber 108 through the orifice 128.

Figure 1:
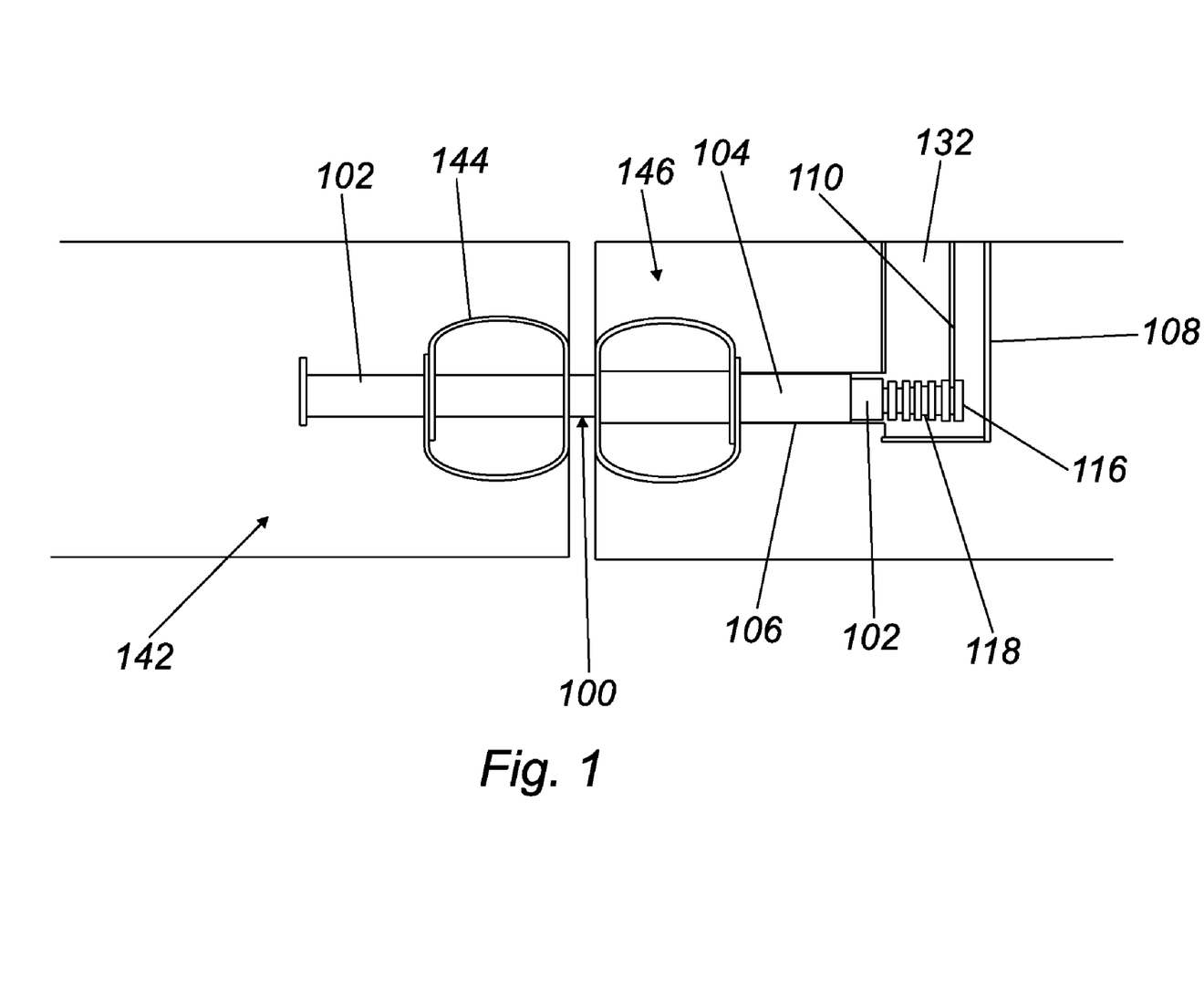
FIG. 1 is a sectional representation of an embodiment of a shear connector according to an aspect of the present invention, in use.
Figures 2, 3, 4:
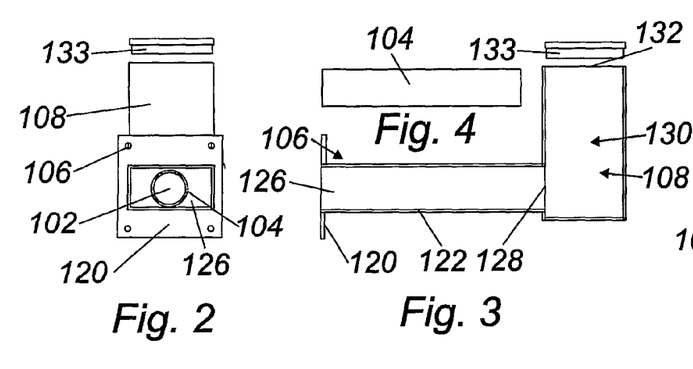
FIG. 2 is a partially exploded front elevation of the shear connector of FIG. 1.
FIG. 3 is a cross-section of a sleeve of the shear connector of FIGS. 1 and 2.
FIG. 4 is a side elevation of a guide tube of the shear connector of FIGS. 1 and 2.

The guide tube 104 is a hollow cylindrical tube having a diameter suitable to accommodate the dowel 102. The guide tube 104 has an inner diameter slightly larger that of the dowel 102 to allow for relative longitudinal motion of the dowel 102 once in situ. The sleeve 106 extends laterally to a greater extent than the guide tube 104. This allows lateral movement of the dowel 102 and guide tube 104 once in situ. This is illustrated by the inset of FIG. 1.

Once initial relative movement of the blocks of building material has occurred the locking plate 110 locates into a groove 118 of the keyed formation 116 within the box 130. The embodiment makes use of a settable fixing or locking medium to fix the dowel. The locking medium is introduced into the box 130 in order to lock the dowel 102 in position and to prevent further movement. In an example, the locking medium is a pourable grout or resin or a low melting point metal. Other possible materials will readily suggest themselves. The locking medium sets and restricts the motion of the dowel 102, preferably preventing further motion of the dowel 102.

In a preferred embodiment, the fixing medium will fill the box 130 until it is completely full and will fill as much of the cover section 122 as possible. In order to reduce the outflow of the fixing medium into the joint an optional intermediate sleeve (not shown) may lie between the guide tube 104 and the sleeve 106. The intermediate sleeve may comprise a compressible material, such as foam. The intermediate sleeve may extend only partially about the outer circumference of the guide tube. It may also only be positioned close to the joint between the two slabs.

Figure 6A:
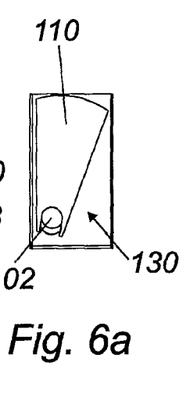
FIGS. 6a to 6c are sectional views of the locking plate of FIG. 5, in-situ in the shear connector of FIGS. 1 and 2 in differing locking positions.
Figure 6B:
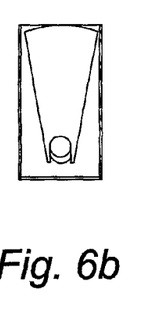
Figure 6C:
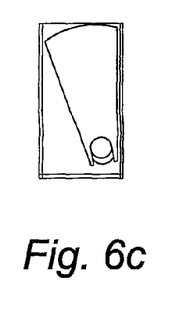

With particular reference to FIGS. 6a to 6c, it can be seen that the conformation of the locking plate 110 allows the locking of the dowel 102 is any possible position within the box 130.

It will be appreciated that although described with reference to a shear connector 100 comprising a locking plate 110 it is envisaged that the keyed formation 116 of the dowel 102 provides sufficient fixing in order to restrict, or prevent, further motion of the dowel 102.

With particular reference to FIGS. 7a to 7d, it will be appreciated that a pin, welded disc or plate, or a screw threaded free end with a complementarily threaded head or nut are suitable terminations for a distal end of the dowel 102 for use in the shear connector 100.

Figure 7A:
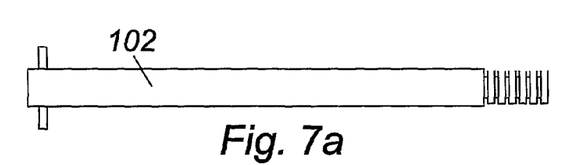
FIGS. 7a to 7d are sectional views of dowels of the shear connectors of FIGS. 1 and 2 having alternative distal end formations.
Figures 7B, 7C:
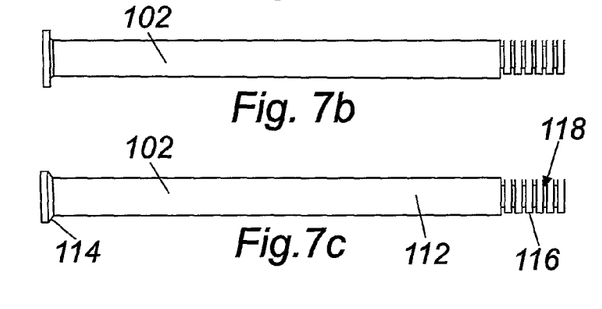
Figure 7D:
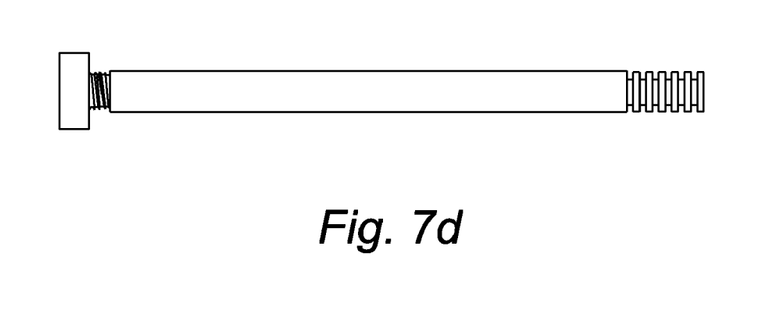
Figure 7E:
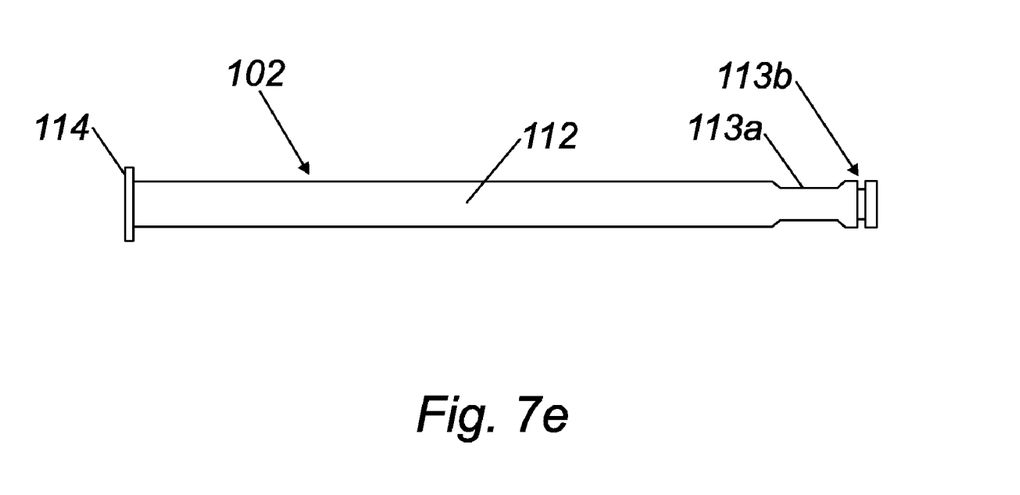
FIGS. 7e to 7i are sectional views of alternative proximal end formations of the shear connectors of FIGS. 1 and 2.

With particular reference to FIGS. 7e, an alternative embodiment of the dowel 102 comprises a cylindrical rod 112 having an upset head 114 at its distal end and waisted section 113a adjacent an annular gallery 113b extending circumferentially about its proximal end. The annular gallery 113b is arranged to receive the locking plate 110. The waisted section 113a provides additional grip for the resin when poured into the box 130, thus improving the strength of a fixing comprising the shear connector 100.

Figures 7F, 7G:
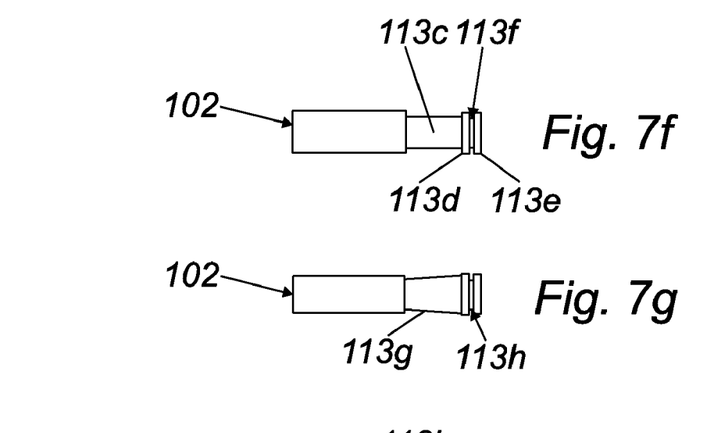

Referring now to FIG. 7f, the proximal end of the dowel 102 comprises a cylindrical portion 113c having a diameter less than that of the shank of the dowel 102 with a pair of spaced apart annular collars 113d,e adjacent the proximal free end of the dowel 102. The collars 113d, e define an annular gallery 113f arranged to receive the locking plate 110.

Referring now to FIG. 7g, the proximal end of the dowel 102 comprises a frustoconical portion 113g that tapers outwardly towards the free end of the shank of the dowel 102. The frustoconical portion 113g flares to a diameter approximately the same as the shank of the dowel 102. An annular gallery 113h extends circumferentially about the proximal free end of the dowel 102. The gallery 113h is arranged to receive the locking plate 110.

Figure 7H:
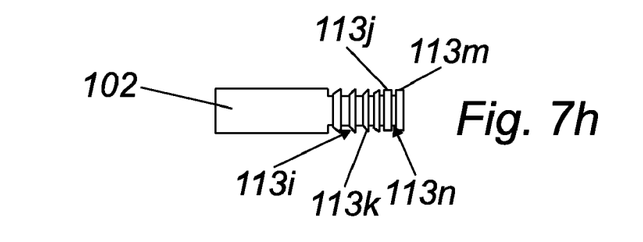

Referring now to FIG. 7h, the proximal end of the dowel 102 comprises a keyed formation 113i in which each key 113j comprises a frustoconical collar 113k. The collars 113k taper outwardly towards the free end of the shank of the dowel 102. A pair of spaced apart annular collars 113l,m adjacent the proximal free end of the dowel 102 define an annular gallery 113n arranged to receive the locking plate 110.

Figure 7I:
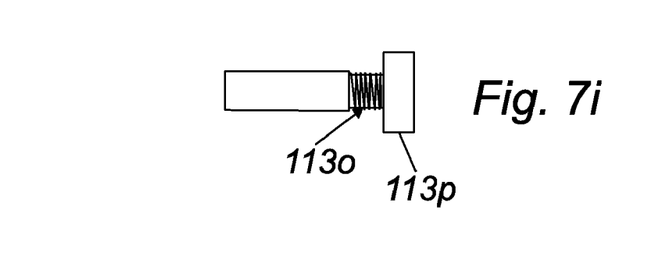

Referring now to FIG. 7i, the proximal free end of the dowel 102 comprises a screw threaded portion 113o. A complimentarily threaded head, or nut, 113p engages with the threaded portion 113o. In one embodiment, the pitch of the screw threaded portion 113o may be such to allow the engagement of the locking plate 110 therewith.

Figures 8, 9:
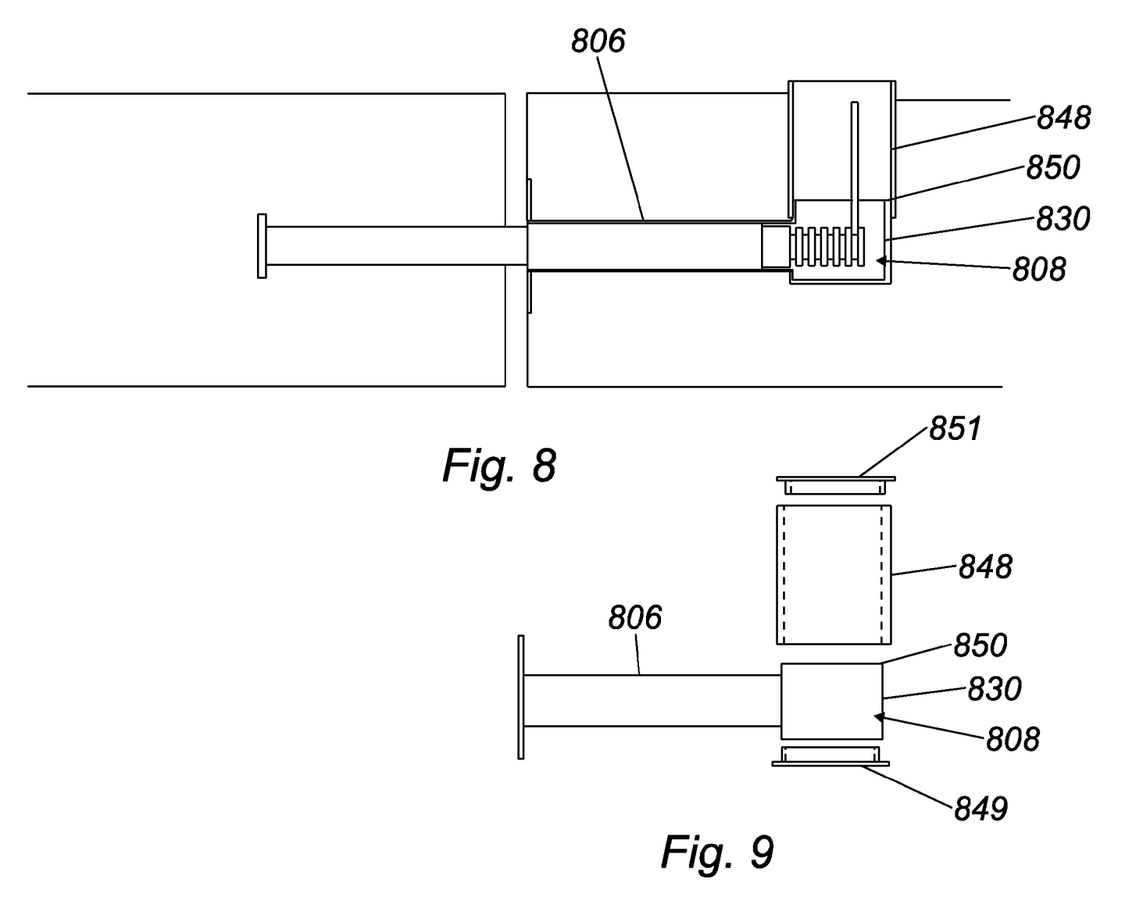
FIG. 8 is a sectional view of a second embodiment of a shear connector according to the present invention, in use.
FIG. 9 is an exploded sectional view of a sleeve section and a fixing chamber of the shear connector of FIG. 8.

Referring now to FIGS. 8 and 9, an embodiment of a shear connector is shown that is substantially the same as that described with reference to FIGS. 1 to 7i. Accordingly, similar parts will be accorded similar reference numerals in the eight hundred series.

In the present embodiment, the fixing chamber 808 comprises a hollow box 830 open at both ends. The box 830 extends beyond the diameter of the sleeve 806 only slightly. A cap 849 seals the lower opening of the box 830.

A tube 848 engages an upper rim 850 of the box 830. Typically, the tube 848 is cut to a length that is appropriate for the depth of the building block which is formed about it. Normally, a second cap 851 is used to seal the tube 848 whilst the building block is formed.

Usually, the tube 848 is removed prior to the pouring of the grout or resin into the box 830. This provides for good adherence of the grout or resin to the building block within the void left by the removal of the tube 848.

Figure 10:
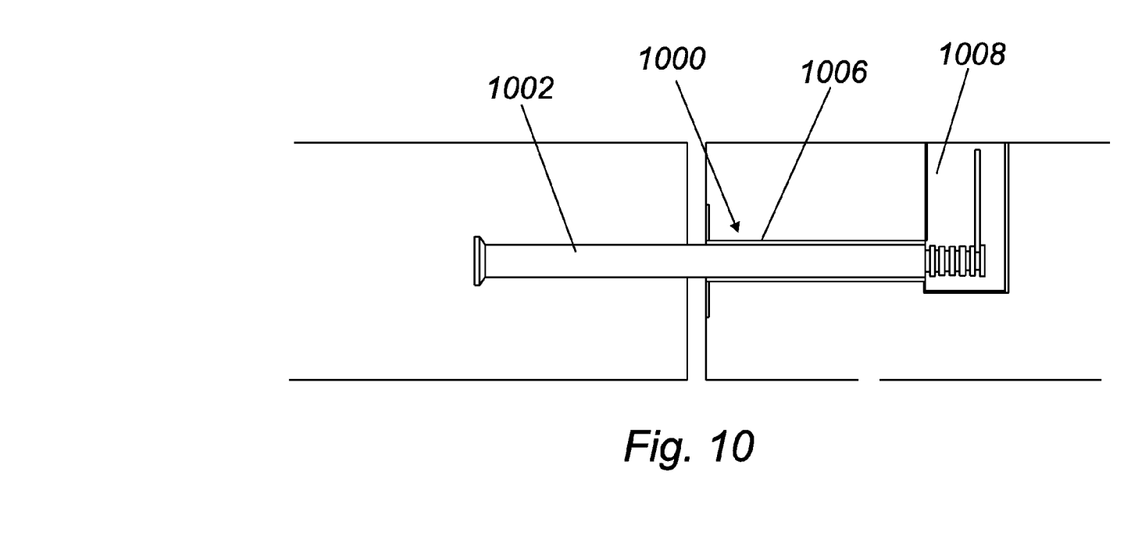
FIG. 10 is a sectional view of a third embodiment of a shear connector according to the present invention, in use.
Figure 11:
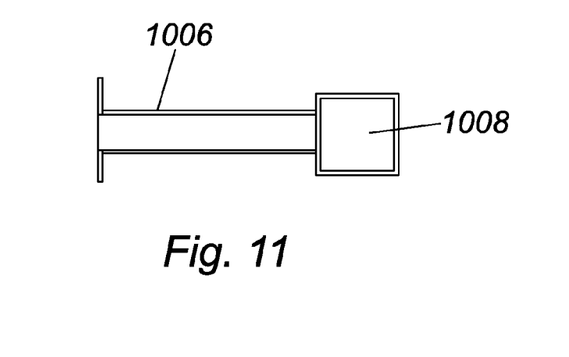
FIG. 11 is a top plan view of a sleeve of the shear connector of FIG. 10.

Referring now to FIGS. 10 and 11, an embodiment of a shear connector is shown that is substantially the same as that described with reference to FIGS. 1 to 7i. Accordingly, similar parts will be accorded similar reference numerals in the one thousand series.

A shear connector 1000 comprises a dowel 1002, a guide tube/sleeve 1006 and a fixing chamber 1008.

Figure 10A:
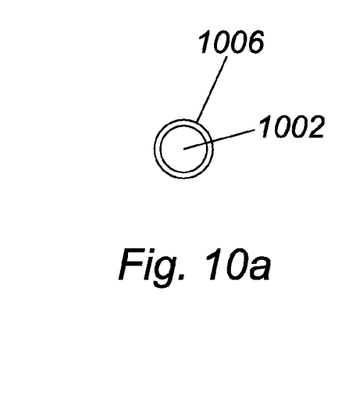

The guide tube 1006 is a hollow cylindrical tube having a diameter suitable to accommodate the dowel 1002. Typically, the guide tube 1006 has an inner diameter only slightly larger than that of the dowel 1002 in order to prevent excess relative lateral movement between the two. Such an arrangement allows for compensation of relative longitudinal motion only. This is illustrated in the inset in FIG. 10a.

In this embodiment no separate sleeve is used and the guide tube connects directly to the fixing chamber.

It will be appreciated that any of the conformations of either the dowel or the locking plated described with reference to FIGS. 1 to 7i may be used in conjunction with the either of the second or third embodiments of the shear connector.

Figures 12, 12A:
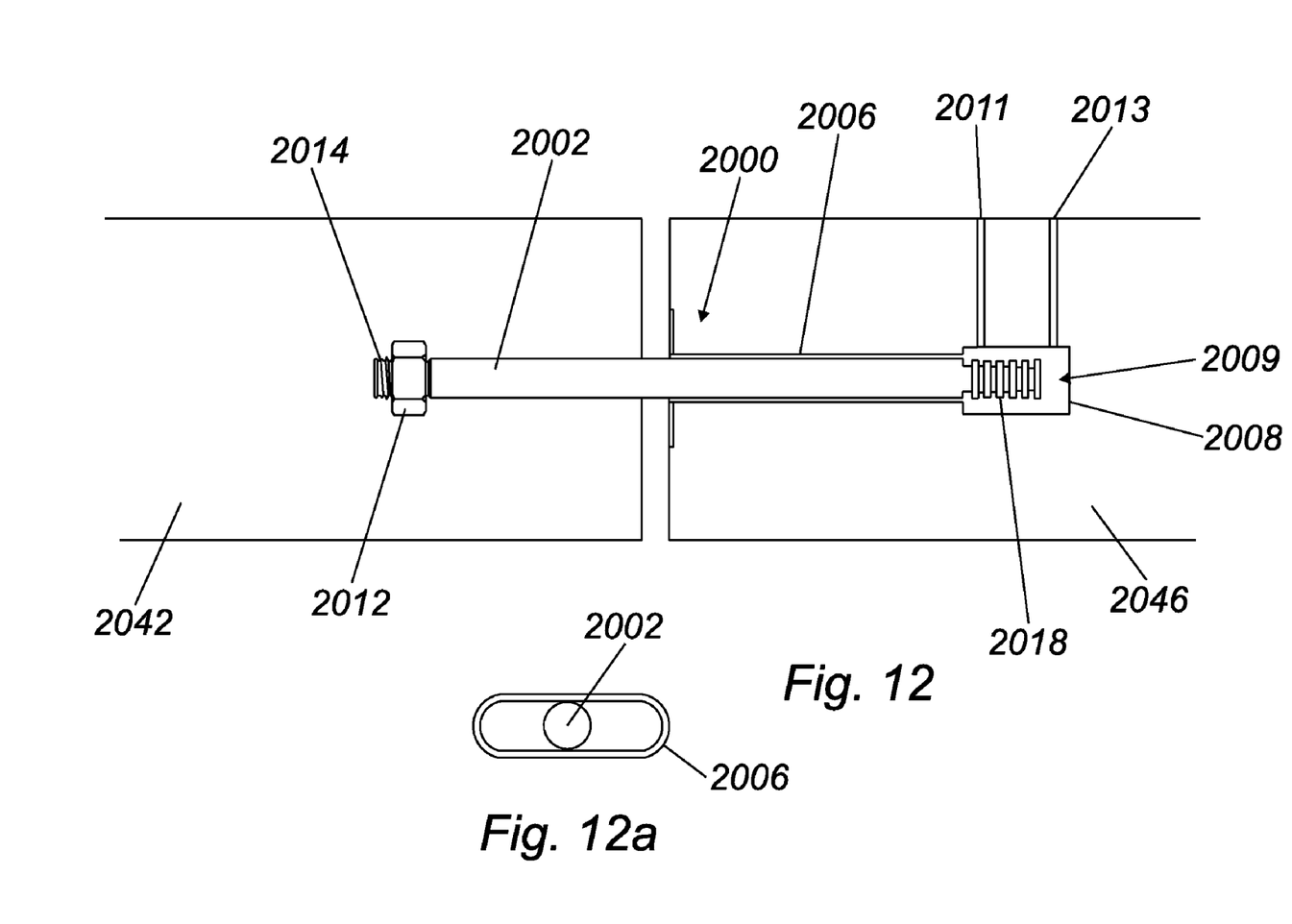
FIG. 12 is a sectional view of a fourth embodiment of a shear connector according to the present invention, in use.

FIG. 12 illustrates an alternative arrangement to that illustrated in FIGS. 1 and 10, again based on the general principle of the use of a fixing medium, but with an alternative design of fixing chamber. A number of parts are substantially the same as those described by reference to FIGS. 1 to 7i. Accordingly, similar parts will be corded similar reference numerals in the 2000 series.

A shear connector 2000 comprises a dowel 2002, a guide tube/sleeve 2006 and a fixing chamber 2008. The guide tube/sleeve 2006 is a hollow cylindrical tube having a diameter suitable to accommodate the dowel 2002. The tube 2006 has a lateral extent larger than that of the dowel 1002 in order to allow relative lateral movement between the two in addition to relative longitudinal motion. This is illustrated in the inset in FIG. 12a. In this embodiment no separate sleeve is used and the tube 2006 connects directly to the fixing chamber. The tube 2006 thus performs the functions of both the guide tube and the sleeve in embodiments where such components are separately present.

A nut 2012 on a threaded head 2014 of the dowel 2002 serves to retain a first end of the dowel fixedly in a first concrete block 2042. The guide tube assembly is retained in a second concrete block 2046.

The main difference between the guide tube assembly of FIG. 12 and that of the earlier embodiments is that the fixing chamber 2008 is relatively small, and includes a relatively small void 2009 into which grout may be introduced. At least one inlet 2011 and at least one outlet 2013 are provided extending via respective channels within the block 2046 to allow communication with the void 2009.

To fix the key formation 2018 of the dowel unset grout is inserted through the inlet until such time as excess emerging from the outlet indicates that the void 2009 is substantially full. At this point the grout can be set. Typically, a single inlet but a plurality of outlets distributed across the void may be provided.

Figure 13:
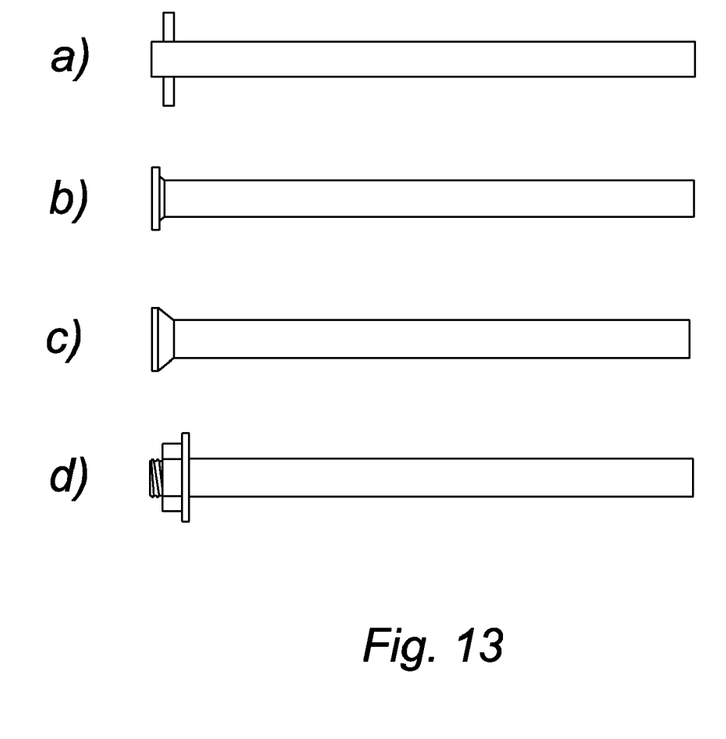
FIG. 13 illustrates alternative fixed end structures for the shear connectors of the above embodiments.

FIG. 13 shows alternative arrangements for a fixed mounting which might be provided at one end of the dowel. FIGS. 13a to d respectively illustrate a pin, a welded disc or plate, an upset/forged head, and a threaded end with nut and washer. Other fixed mountings could be envisaged. Alternatively, this end of the dowel could be provided with an adjustable mounting, for example of like structure to the other end.

Figure 14A:
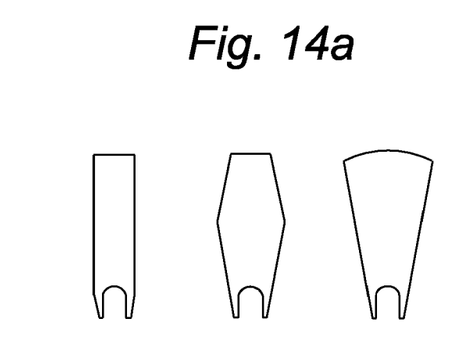
FIG. 14 illustrates alternative locking plate structures for the shear connectors of the above embodiments.
Figure 14B:
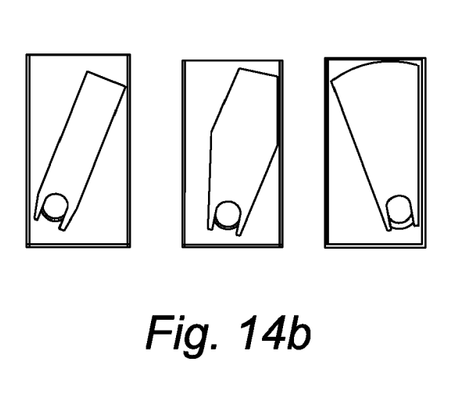

FIG. 14a illustrates alternative locking plate formations, and FIG. 14b illustrates those locking plate formations as they might be retained within a fixing chamber with the dowel in a range of positions.

FIG. 15 is a sectional representation of an embodiment of a shear connector according to an alternate aspect of the present invention. In an alternative embodiment, the first end is also provided with a fixing formation adapted to allow initial motion of the dowel 102 longitudinally or laterally. Preferably such a fixing formation comprises an assembly employing equivalent principles to that at the second end. Thus, the first end is adapted to be retained within a building material by means of a further guide tube 104 and fixing chamber assembly including a further fixing chamber 108 arranged to receive a fixing means, the fixing means being arranged to restrict the motion of the dowel 102 within the guide tube 104. Thus, a guide tube 104 and fixing chamber 108 assembly providing for selective fixing of the dowel 102 according to the principles of the invention is provided at both the first and the second end. Alternatively, a fixing formation of alternate and for example conventional design adapted to allow initial motion of the dowel 102 longitudinally or laterally is provided at the first end.

While various embodiments of the invention have been described, it will be apparent to those skilled in the art once given this disclosure that various modifications, changes, improvements and variations may be made without departing from the scope of the invention.

The invention claimed is:

1. A connector comprising:
    a guide tube having a width and disposed adjacent a joint between adjacent blocks of building materials;
    a dowel that passes between and transfers vertical shear between the adjacent blocks of building materials and having a width, a first end, and a second end, the second end of the dowel being received by the guide tube so as to allow longitudinal movement of the dowel in the guide tube;
    a sleeve that receives the guide tube and allows for lateral and rotational movement of the dowel, the sleeve having a lateral sleeve width in excess of the width of the guide tube;
    a fixing chamber coupled to the sleeve and comprising:
    an open end that receives fixing means that restricts motion of the dowel within the guide tube; and
    an orifice that receives the second end of the dowel.

2. The connector according to claim 1, wherein the first end is adapted to be retained in a fixed relationship with one of the adjacent blocks and the second end is provided with the guide tube and the fixing chamber.

3. The connector according to claim 2, wherein the first end is provided with a fixing formation adapted to be retained directly within one of the adjacent blocks.

4. The connector according to claim 2, wherein:
    the first end is adapted to be retained within the one of the adjacent blocks by a second guide tube;
    the connector comprises a second fixing chamber;
    the second guide tube is arranged to receive the first end so as to allow longitudinal movement of the dowel in the second guide tube, the second fixing chamber being arranged to receive fixing means, the fixing means being arranged to restrict the motion of the dowel within the second guide tube when received in the second fixing chamber.

5. The connector according to claim 1, wherein the fixing chamber is formed integrally with the guide tube.

6. The connector according to claim 1, wherein the fixing chamber extends perpendicularly to a longitudinal axis of the guide tube.

7. The connector according to claim 1, wherein the dowel passes through the guide tube and into a section of the sleeve.

8. The connector according to claim 7, wherein the dowel passes through the section of the sleeve and into the fixing chamber.

9. The connector according to claim 1, wherein the fixing chamber comprises a box formation having the open end.

10. The connector according to claim 9, wherein the fixing chamber comprises a tube arranged to engage an opening of the box formation.

11. The connector according to claim 9, wherein the fixing chamber comprises a cap arranged to releasably seal the open end of the fixing chamber.

12. The connector according to claim 9, wherein the orifice is remote from the open end.

13. The connector according to claim 1, wherein the fixing chamber is removable from the connector.

14. The connector according to claim 1, wherein the fixing chamber comprises a plastics material.

15. The connector according to claim 1, wherein the dowel comprises a keyed section comprising a keying formation arranged to pass into the fixing chamber.

16. The connector according to claim 15, wherein the keyed section is arranged to engage with the fixing means.

17. The connector according to claim 15, wherein the keyed section is located at the second end of the dowel.

18. The connector according to claim 15, wherein the keyed section includes a keying formation comprising at least one of the following:
    groove, step, channel, saw-tooth, waisted section, frusto-conical section, frustoconical keying, screw-thread and nut arrangement.

19. The connector according to claim 18, wherein the keying formation extends laterally about the second end of the dowel.

20. The connector according to claim 1, wherein the fixing means comprises a fixing member selectively engageable with the dowel in the fixing chamber.

21. The connector according to claim 1, wherein the fixing chamber comprises a locking device.

22. The connector according to claim 21, wherein the locking device engages a keying formation.

23. The connector according to claim 21, wherein the locking device comprises a plate.

24. The connector according to claim 23, wherein the plate is arcuate.

25. The connector according to claim 1, wherein the fixing means comprises a fixing medium.

26. The connector according to claim 25, wherein the fixing medium comprises a hardenable fluid.

27. The connector according to claim 25, wherein the fixing medium comprises a grout or a resin.

28. The connector according to claim 27, wherein the grout or resin is pourable prior to setting.

29. A method of locking a dowel of a connector comprising the steps of:
   providing a connector according to claim 1 so as to allow at least longitudinal movement of the dowel in a guide tube;
   introducing a fixing means into the fixing chamber; and
   fixing the fixing means to restrict the motion of the dowel within the guide tube.

30. The method of claim 29, wherein the fixing means comprises a fixing member selectively engageable with the dowel in the fixing chamber and the fixing the fixing means comprises engaging the fixing member with the dowel.

31. The method of claim 29, wherein the fixing means comprises:
   a hardenable fixing medium and the fixing the fixing means comprises substantially filling the fixing chamber with the fixing medium; and
   allowing the fixing medium to harden.

32. A kit of parts comprising:
   the connector according to claim 1;
   the connector comprising the dowel;
   the guide tube; and
   the fixing chamber.

33. A kit for retrofitting a fixing chamber to a known connector comprising:
   the connector according to claim 1; and
   the fixing chamber.

* * * * *